US008594869B2

(12) United States Patent
Hwang

(10) Patent No.: US 8,594,869 B2
(45) Date of Patent: Nov. 26, 2013

(54) MOTOR CONTROL METHOD AND CONTROL DEVICE FOR ELECTRICAL FORKLIFT TRUCK

(75) Inventor: Joon Ha Hwang, Seoul (KR)

(73) Assignee: Doosan Corporation, Seoul (KR)

( * ) Notice: Subject to any disclaimer, the term of this patent is extended or adjusted under 35 U.S.C. 154(b) by 618 days.

(21) Appl. No.: 12/810,720

(22) PCT Filed: Dec. 24, 2008

(86) PCT No.: PCT/KR2008/007690

§ 371 (c)(1),
(2), (4) Date: Jun. 25, 2010

(87) PCT Pub. No.: WO2009/084869

PCT Pub. Date: Jul. 9, 2009

(65) Prior Publication Data

US 2010/0274428 A1 Oct. 28, 2010

(30) Foreign Application Priority Data

Dec. 27, 2007 (KR) ........................ 10-2007-0139236

(51) Int. Cl.
*B60W 20/00* (2006.01)
*B60W 10/08* (2006.01)
*B60K 1/00* (2006.01)
*H02P 1/00* (2006.01)

(52) U.S. Cl.
USPC ............. 701/22; 903/903; 180/65.1; 318/139

(58) Field of Classification Search
USPC ............. 701/22; 903/903; 180/65.1; 318/139
See application file for complete search history.

(56) References Cited

U.S. PATENT DOCUMENTS 5,638,387 A 6/1997 Palleggi et al.

FOREIGN PATENT DOCUMENTS

CN 1395153 A 2/2003
CN 2756613 Y 2/2006

(Continued)

OTHER PUBLICATIONS

English translation of JP 2005-219615 EPO.*

(Continued)

*Primary Examiner* — Fadey Jabr
*Assistant Examiner* — Yazan A Soofi
(74) *Attorney, Agent, or Firm* — John D. Veldhuis-Kroeze; Westman, Champlin & Koehler, P.A.

(57) ABSTRACT

A method for controlling a motor of an electrical forklift truck which includes at least one motor for traveling of the forklift truck or providing power to a pump that supplies power for operating a vehicle or oil to operational devices, a power module for controlling the power supply to the motors, and a control unit for controlling the power module and the motor, the method including the steps of: controlling to decelerate operating speed of the motor to be predetermined first decelerated speed by the control unit if a temperature of the motor and/or the power module increases and reaches a predetermined first level temperature value corresponding to the operating speed of the motor; and controlling to decelerate the operating speed of the motor to be predetermined second decelerated speed that is lower than the first decelerated speed by the control unit if the temperature of the motor and/or the power module increases in a state of the speed of the motor having been decelerated and reaches predetermined second-level temperature value that is higher than the first level temperature value and corresponds to the first decelerated speed. In this respect, the shutdown of the motor is postponed as long as possible so as to expend the operating time of the electrical forklift truck. Further, the shutdown of the motor can be postponed even without mounting the separate cooling apparatus, such as the cooling fan, so as to reduce the manufacturing cost.

19 Claims, 2 Drawing Sheets

(56) References Cited

FOREIGN PATENT DOCUMENTS

| | | | | |
|---|---|---|---|---|
| EP | 0664273 | A1 | | 7/1995 |
| EP | 1764254 | A1 | | 3/2007 |
| JP | 02-028499 | | | 1/1990 |
| JP | 2005-219615 | | | 8/2005 |
| JP | 2005219615 | A | * | 8/2005 |
| JP | 2007205683 | A | * | 8/2007 |

OTHER PUBLICATIONS

English translation of jp 2007-205683.*

Office Action dated Aug. 27 for Chinese Patent Application No. 200880123019.8, 5 pages.

Search Report dated Oct. 22, 2009 for International application No. PCT/KR2008/007690, filed Dec. 24, 2008.

Extended European Search Report dated Feb. 1, 2013 for European Patent Application No. 08866969.2, 4 pages.

* cited by examiner

MOTOR CONTROL METHOD AND CONTROL DEVICE FOR ELECTRICAL FORKLIFT TRUCK

CROSS-REFERENCE TO RELATED APPLICATIONS

This Application is a Section 371 National Stage Application of International Application No. PCT/KR2008/007690, filed Dec. 24, 2008 and published as WO 2009/084869 on Jul. 9, 2009 in English.

FIELD OF THE DISCLOSURE

The present disclosure relates to a method and device for controlling a motor of an electrical forklift truck, and more particularly to a method and device for controlling a motor of an electrical forklift truck which can postpone the shutdown of an electrical forklift truck according to the temperature increase of a drive motor and a power module of a controller occurring when the electrical forklift truck is continuously operated.

BACKGROUND OF THE DISCLOSURE

A forklift truck is used for lifting and laying down cargo or shifting cargo to a desired place within a limited space, which can be classified as an engine forklift truck and an electrical forklift truck depending on the power resources. Especially, an electrical forklift truck is operated by electricity supplied from a battery, which includes a drive motor for driving and a pump motor for hydraulic driving.

The drive motor is an electric motor driven by electricity. The electric motor generates high-temperature heat when being driven, and if the temperature of the motor and controller reaches the predetermined high temperature, the drive motor triggers a system shutdown to prevent components from being damaged due to dielectric break. Therefore, in order to restrain the increase of the temperature, a cooling apparatus, such as a cooling fan, is separately mounted on the motor and controller so as to extend the time of continuous operation of the electrical forklift truck.

However, there is a problem when the cooling apparatus is separately mounted for postponing the shutdown and extending the time of continuous operation in the conventional forklift truck, the energy is consumed for driving the cooling apparatus so as to decrease the effect of postponing the shutdown of the forklift truck, and additional cost is incurred for constructing the separate cooling apparatus.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an aspect of a disclosed embodiment of the present invention, there is provided a method for controlling a motor of an electrical forklift truck which includes at least one motor for traveling of the forklift truck or providing power to a pump that supplies power for operating a vehicle or oil to operational devices, a power module for controlling the power supply to the at least one motor, and a control unit for controlling the power module and the motor, the method including the steps of: controlling to decelerate operating speed of the motor to be predetermined first decelerated speed by the control unit if a temperature of the motor and/or the power module increases and reaches a predetermined first level temperature value (A) corresponding to the operating speed of the motor; and controlling to decelerate the operating speed of the motor to be predetermined second decelerated speed that is lower than the first decelerated speed by the control unit if the temperature of the motor and/or the power module increases in a state of the speed of the motor having been decelerated and reaches predetermined second-level temperature value (B) that is higher than the first level temperature value and corresponds to the first decelerated speed.

Further, the specific embodiments for the above embodiment of the present disclosure are further provided.

According to an embodiment of the present invention, the control unit controls to decelerate the speed of the motor to be predetermined third decelerated speed that is lower than the second decelerated speed and determining that the power module is in a state of over-heating so as to notify shutdown of the motor, when the temperature of the power module is continuously increased even at the second decelerated speed and reaches predetermined third-level temperature value (C) that is higher than the second-level temperature value (B).

According to an embodiment of the present invention, the control unit controls to decrease the operating torque of the motor, when the temperature of the motor and/or the power module continuously increases in a state where the motor is controlled to decelerate to have the third decelerated speed and reaches a predetermined temperature corresponding to the operating torque of the motor.

According to an embodiment of the present invention, the operating torque decreased corresponding to the temperature increase is a minimum operating torque required for emergency driving of the electrical forklift truck.

According to an embodiment of the present invention, the third decelerated speed is minimum operating speed required for emergency driving of the electrical forklift truck.

According to an embodiment of the present invention, if the temperature of the motor and/or the power module continuously increases in a state where the motor is controlled to decelerate to have the second decelerated speed and reaches a predetermined temperature corresponding to the operating torque of the motor, the control unit controls to decrease the operating torque of the motor.

According to an embodiment of the present invention, the operating torque decreased corresponding to the temperature increase is a minimum operating torque required for emergency driving of the electrical forklift truck.

According to an embodiment of the present invention, the second decelerated speed is minimum operating speed required for emergency driving of the electrical forklift truck.

According to an embodiment of the present invention, the decreasing of the operating torque is performed for each of a plurality of intervals sequentially formed in a direction of decreasing the operating torque being decreased, and the operating torque that is finally decreased is a minimum operating torque required for emergency driving of the electrical forklift truck, and if the temperature of the motor or the power module increases up to a predetermined temperature corresponding to the corresponding operating torque in the state where the operating torque has been decreased by the minimum operating torque, the control unit shutdowns the motor.

According to an embodiment of the present invention, the control unit determines that the power module is in an over-heating state after decreasing the operating torque and controls to notify the shutdown of the motor.

According to an embodiment of the present invention, the operating speed of the motor is controlled to be linearly decelerated for every predetermined temperature interval.

According to an embodiment of the present invention, the operating torque of the motor is controlled to be linearly decreased for every predetermined temperature interval.

According to an embodiment of the present invention, if the temperature does not increase up to a temperature corresponding to the corresponding decelerated speed during a predetermined time in a state where the operating speed of the motor has been decelerated by the first decelerated speed or the second decelerated speed, the control unit observes if the temperature of the motor or the power module increases to the predetermined temperature corresponding to the corresponding operating speed while increasing the operating speed of the motor to the operating speed that is prior to being decelerated.

In accordance with another aspect of the disclosure, there is provided a method for controlling a motor of an electrical forklift truck which includes at least one motor for traveling of the forklift truck or providing power to a pump that supplies power for operating a vehicle or oil to operational devices, a power module for controlling the power supply to the at least one motor, and a control unit for controlling the power module and the motor, the method including the steps of: controlling to decrease operating torque of the motor to be predetermined first torque by the control unit when a temperature of the motor and/or the power module increases to a predetermined first level temperature value (A) corresponding to the operating torque of the motor; and controlling the motor to be driven in predetermined second torque that is lower than the first torque by the control unit when the temperature of the motor and/or the power module increases in a state of the torque of the motor having been decreased and reaches predetermined second-level temperature value (B) that is higher than the first level temperature value and corresponds to the first torque.

Further, the specific embodiments for the above embodiment of the present disclosure are further provided.

According to an embodiment of the present invention, the control unit controls to decelerate the operating speed of the motor to be predetermined first decelerated speed, when a temperature of the motor and/or the power module increases and reaches predetermined first-level temperature value (A) corresponding to operating speed of the motor in a state where the torque of the motor is decreased by the second torque, and the control unit controls to decelerate the operating speed of the motor to be predetermined second decelerate speed that is lower than the first decelerated speed, when a temperature of the motor and/or the power module increases and reaches a predetermined second-level temperature value (B) that is higher than the first-level temperature value and corresponds to the first decelerated speed in a state where the speed of the motor has been decelerated.

According to an embodiment of the present invention, the control unit controls the speed of the motor to be predetermined third decelerated speed that is lower than the second decelerated speed and determines that the power module is in an over-temperature state so as to notify the shutdown of the motor, when a temperature of the power module continuously increases even at the second decelerated speed and reaches predetermined third-level temperature value (C) that is higher than the second-level temperature value (B).

According to an embodiment of the present invention, the second torque and the third operating speed are minimum operating torque and minimum operating speed required for emergency driving of the electrical forklift truck, respectively, and if the temperature of the motor and/or the power module increases over the predetermined temperature at the third operating speed, the control unit shutdowns the motor.

According to an embodiment of the present invention, the control unit observes if the temperature of the motor or the power module increases up to the predetermined temperature corresponding to the corresponding operating speed while increasing the operating speed of the motor up to the operating speed that is prior to being decelerated, when the temperature of the motor and/or the power module does not increase up to the predetermined temperature corresponding to the corresponding operating speed for a predetermined time period in a state where the operating speed of the motor has been decelerated.

In accordance with another aspect of the present disclosure, there is provided a device for controlling a motor of an electrical forklift truck, including: a drive motor for driving; a pump motor for pumping oil; power modules for the motors; a control unit for controlling the motors and power modules; speed sensors and temperature sensors mounted on the drive motor and the pump motor, respectively; and current sensors and temperature sensors mounted on the power modules for the drive motor and the pump motor, respectively, in which the control unit receives a signal from the speed sensors and the temperature sensors and controls to linearly decelerate the driving of the drive motor and the pump motor for every temperature interval of the power module corresponding to predetermined operating speed for the operating speed of the drive motor and the pump motor and for every temperature interval of the drive motor corresponding to predetermined torque outputted from the drive motor and the pump motor.

Therefore, example embodiments of the disclosure can control to linearly decelerate the speed or torque of the drive motor based on the temperature of the drive motor and the respective power modules, so as to postpone the shutdown of the motor as long as possible and expend the operating time of the electrical forklift truck. Further, contrary to at least some conventional techniques, the shutdown of the motor can be postponed even without mounting the separate cooling apparatus, such as the cooling fan, so as to reduce the manufacturing cost.

BRIEF DESCRIPTION OF THE DRAWINGS

The foregoing and other objects, features and advantages of embodiments of the present disclosure will become more apparent from the following detailed description when taken in conjunction with the accompanying drawings in which.

DETAILED DESCRIPTION

Hereinafter, exemplary embodiments of the present invention will be described with reference to the accompanying drawings in detail.

Figure 1:
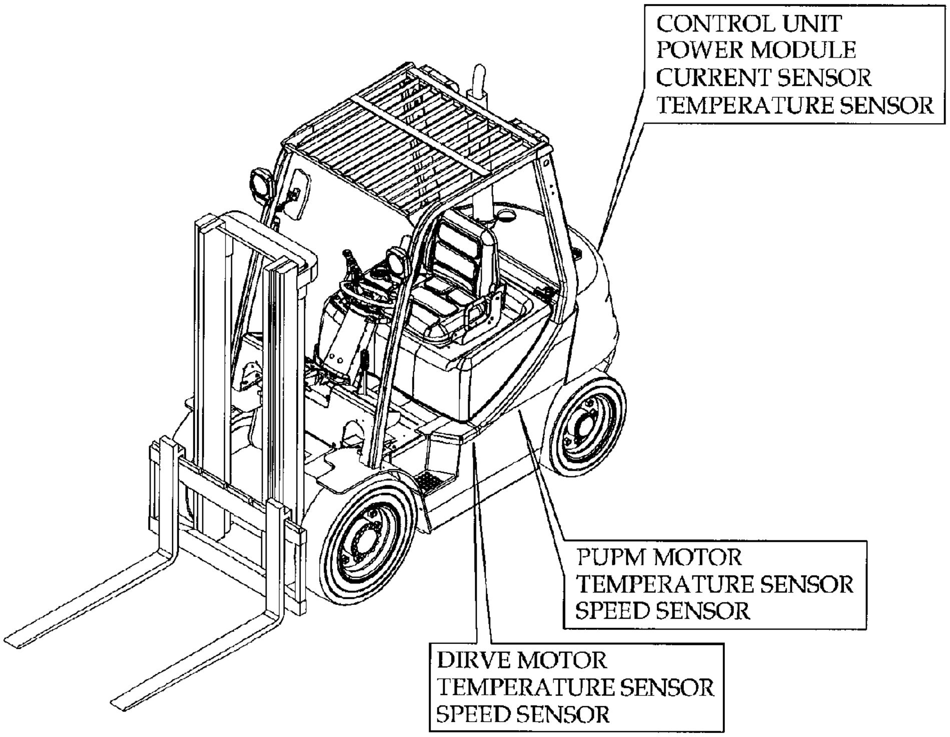
FIG. 1 is a perspective view schematically illustrating the positions of the constructional components of an electrical forklift truck.
Figure 2:
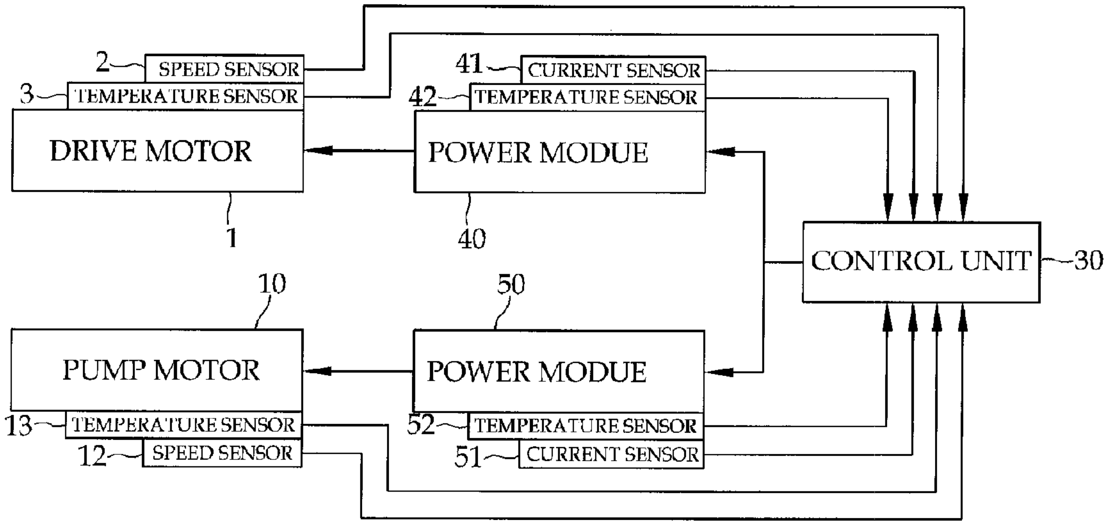
FIG. 2 is a block diagram schematically illustrating the construction of a controlling device for implementing a controlling method of an embodiment of the present invention.

FIG. 1 is a perspective view schematically illustrating the construction of an electrical forklift truck, and FIG. 2 is a block diagram schematically illustrating the controlling devices of the electrical forklift truck of an embodiment of the present invention.

The electrical forklift truck includes a drive motor 1 and a pump motor 10 in a lower part thereof. The drive motor 1 and the pump motor 10 include speed sensors 2 and 12, and temperature sensors 3 and 13, respectively. Further, the electrical forklift truck includes a control unit 30 and power modules 40 and 50 for the drive motor 1 and the pump motor 10. The power modules 40 and 50 include current sensors 41 and 51 and temperature sensors 42 and 52, respectively.

The speed sensors 2 and 12 and the temperature sensors 3 and 13 for the motors 1 and 10 sense the rotation speed and the temperature of the motors, respectively, so as to output a signal to the control unit 30 in real time. Further, the current sensors 41 and 51 and the temperature sensors 42 and 52 provided in the respective power modules 40 and 50 also sense the current and temperature of the respective power modules so as to output a corresponding signal to the control unit 30 of a controller. The control unit 30 receives a sensing signal from the sensors of the motors and power modules and controls the motors and power modules in real time, so as to control to postpone the shutdown of the motor as long as possible.

First, a control concept based on the speed of the motor according to the present invention will be described with reference to FIG. 3.

Figure 3:
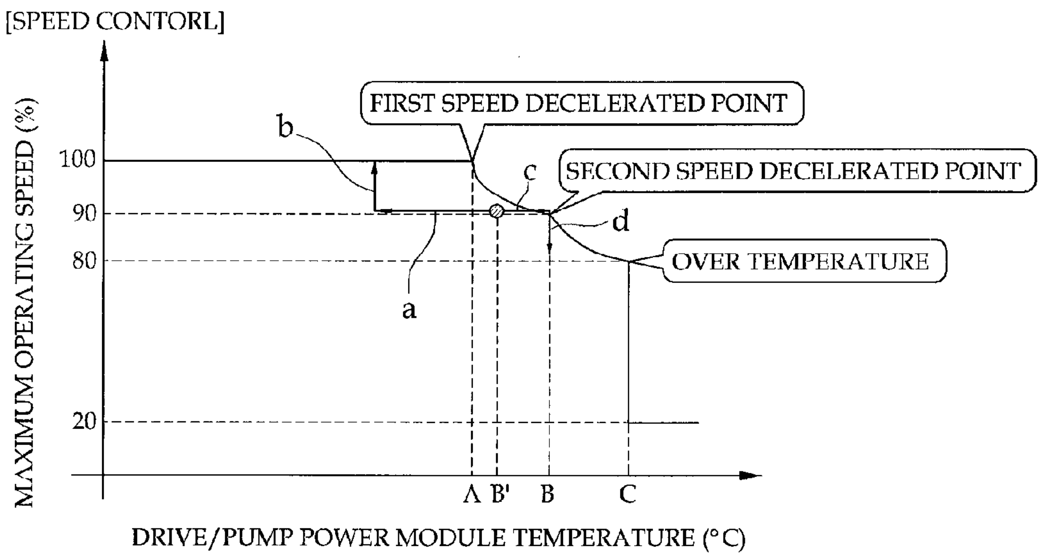
FIG. 3 is a graph illustrating the concept of controlling a motor of an embodiment of the present invention.

Referring to FIG. 3, the vertical axis represents the ratio with respect to the maximum operating speed of the motors and the horizontal axis represents the temperature of the power module of the motors.

If the temperature of the power module reaches the predetermined temperature value (A) at the maximum operating speed (100%) of the motors, the control unit 30 first controls to decelerate the speed of the motor to be 90% of the maximum operating speed. Here, the maximum operating speed may represent the maximum operating speed within the specification of the motor or the maximum operating speed corresponding to the operation of a driver. In this state, if the temperature becomes low like arrow (a) in FIG. 3 or is maintained at a temperature lower than temperature value (B') that is lower than temperature value (B) for a predetermined time period, the control unit 30 determines that the increase of the temperature is little or a temporary error has occurred so that the control unit 30 controls to gradually increase the operating speed (refer to arrow (b)). As described above, if the temperature does not increase, even if the operating speed has been accelerated, the control unit 30 controls the motor to be operated in the normal state. However, if the temperature of the power module increases like arrow (c) and reaches the predetermined temperature (B) while the motor is being driven at a first decelerated speed (90% of the maximum operating speed), secondly the control unit 30 linearly decelerates the speed of the motor to be 80% of the maximum operating speed (refer to arrow (d)).

If the temperature of the power module continuously increases to reach the predetermined temperature value (c) even at a second decelerated speed (80% of the maximum operating speed) of the motor, the control unit 30 determines that the power module is in an over-temperature state so that the control unit 30 notifies the shutdown of the motor for protection and generates a shutdown signal of the motor for protecting the motor.

Hereinafter, a control concept based on the output torque of the motor will be described with reference to FIG. 4.

Figure 4:
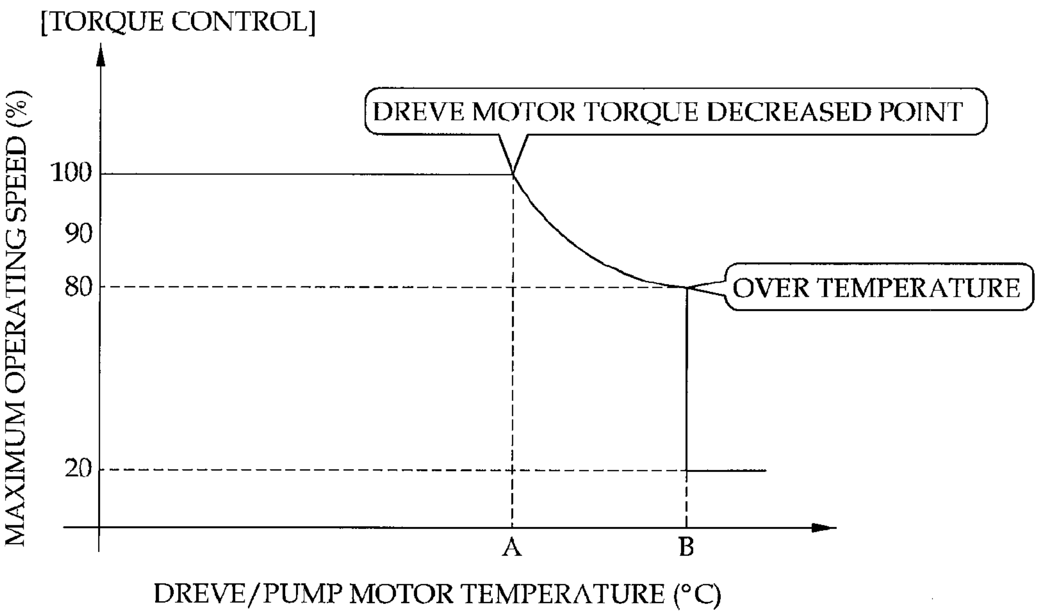
FIG. 4 is a graph illustrating the concept of controlling a motor of an embodiment of the present invention, like FIG. 3.

In FIG. 4, the vertical axis represents the ratio with respect to the maximum operating torque of the motors and the horizontal axis represents the temperature in operating the motors.

If the temperature of the power motor 1 reaches the predetermined temperature value (A) at the maximum operating torque (100%) of the motor 1 and pump motor 10, the control unit 30 first controls to decrease the torque of the motor to be 70% of the maximum operating torque. Here, the maximum operating torque may represent the maximum operating torque according to the specification of the motor or the maximum operating torque corresponding to the operation of a driver. In this state, if the torque is decreased or is maintained at a lower temperature than the temperature that is lower than the temperature (B) for a predetermined time period, the control unit 30 determines that the increase of the temperature is little or a temporary error has occurred so that the control unit 30 controls to gradually increase the operating torque. As described above, if the temperature does not increase, even if the operation torque has been increased, the control unit 30 controls the motor to be driven in the normal state (the controlling method of the operating torque is similar to the afore-mentioned controlling method of the operating speed so the diagram corresponding to the similar controlling method will be omitted in FIG. 4). However, if the temperature of the drive motor gradually increases and reaches the predetermined temperature (B) in a state where the drive motor 1 and the pump motor 10 are controlled to linearly decrease to have 70% of the maximum operating torque, the control unit 30 determines that the motor is in an over-temperature state so that the control unit 30 generates a signal notifying the shutdown of the motors for protecting the motors.

The threshold temperature value for decelerating the speed of the motor in FIG. 3 and the threshold temperature values for decreasing the torque with respect to the maximum operating torque of the motor in FIG. 4 can be adjusted by operator or service man depending on the operating condition and environment in which the electrical forklift truck is used. Further, the motor does not shutdown promptly even in the over-temperature, but the shutdown of the motor is notified in advance so that the electrical forklift truck can be moved to a safe place so as to protect the electrical forklift truck.

The above is an example when the method for controlling the motor is applied to both the pump motor and the drive motor. However, the pump motor typically performs the specific function of delivering oil. So if the pump motor is controlled by the afore-mentioned method, the pump motor may be damaged quickly due to over-heating. Therefore, it is preferred that the afore-mentioned present invention is applied primarily to the drive motor, and additionally applied to the pump motor if need be.

Further, in the foregoing embodiment, it has been described that the rotation speed and the operating torque of the drive motor are separately controlled. However, they are not limited to thereto, but can be simultaneously or sequentially controlled. For example, even though the number of rotation of the motors has been controlled to be the predetermined minimum number of rotation, if the temperature shows higher than the predetermined temperature value, the electrical current outputted from the power modules is controlled for the operating torque to have the predetermined minimum operating torque based on the current operating torque, to measure the temperature value. In this case, it is preferred that the shutdown of the motor is notified at a time point of changing the temperature controlling method and so the sufficient time is secured for allowing the forklift truck to leave the dangerous place as distant as possible even after the notification of the shutdown has been made. This can be implemented by the change of the method in such a manner that the operating torque is controlled first and then the number of rotation times is controlled. However, in general, if the electrical current is changed for controlling the operating torque of the motor, the resulting variation is so great as to deteriorate the operation safety of the forklift truck. Therefore, in some embodiments it is preferred that the number of rotation of the motors is controlled first and then the operating torque is controlled. As such, the two types of methods are sequentially employed, even if the failure occurs in the drive motor, it is possible to postpone the time point of interrupting the drive of the forklift truck as long as possible while securing its safety in comparison with the case employing only one method.

As described above, the embodiments of the present invention control to linearly decelerate the speed of the motors on the basis of the temperature of the motors and the respective power modules. Therefore, the shutdown of the motor can be postponed as long as possible without additionally mounting a separate cooling apparatus, such as a cooling fan, so as to extend the continuous operating time of the electrical forklift truck.

Although the present disclosure has been described with reference to one or more examples, workers skilled in the art will recognize that changes may be made in form and detail without departing from the scope of the disclosure and/or the appended claims.

The invention claimed is:

1. A method for controlling a motor of an electrical forklift truck which comprises at least one motor for traveling of the forklift truck or providing power to a pump that supplies power for operating a vehicle or oil to operational devices, a power module for controlling the power supply to the at least one motor, and a control unit for controlling the power module and the motor, the method comprising:

determining that a temperature of the motor and/or the power module increases and reaches a predetermined first level temperature value, the predetermined first level temperature value being based on the operating speed of the motor;

in response to determining that the temperature reaches the predetermined first level temperature value, using the control unit to decelerate operating speed of the motor to be predetermined first decelerated speed;

while the motor is in a state of having been decelerated, determining that the temperature of the motor and/or the power module increases and reaches a predetermined second level temperature value, the predetermined second level temperature value being higher than the first level temperature value and based on the first decelerated speed; and in response to determining that the temperature reaches the predetermined second level temperature value, using the control unit to decelerate the operating speed of the motor to be predetermined second decelerated speed that is lower than the first decelerated speed.

2. The method as claimed in claim 1, wherein, the control unit controls to decelerate the speed of the motor to be predetermined third decelerated speed that is lower than the second decelerated speed and determining that the power module is in a state of over-heating so as to notify shutdown of the motor, when the temperature of the power module is continuously increased even at the second decelerated speed and reaches predetermined third-level temperature value that is higher than the second-level temperature value.

3. The method as claimed in claim 2, wherein, the control unit controls to decrease the operating torque of the motor, when the temperature of the motor and/or the power module continuously increases in a state where the motor is controlled to decelerate to have the third decelerated speed and reaches a predetermined temperature corresponding to the operating torque of the motor.

4. The method as claimed in claim 3, wherein the operating torque decreased corresponding to the temperature increase is a minimum operating torque required for emergency driving of the electrical forklift truck.

5. The method as claimed in claim 3, wherein the third decelerated speed is minimum operating speed required for emergency driving of the electrical forklift truck.

6. The method as claimed in claim 1, wherein, if the temperature of the motor and/or the power module continuously increases in a state where the motor is controlled to decelerate to have the second decelerated speed and reaches a predetermined temperature corresponding to the operating torque of the motor, the control unit controls to decrease the operating torque of the motor.

7. The method as claimed in claim 6, wherein the operating torque decreased corresponding to the temperature increase is a minimum operating torque required for emergency driving of the electrical forklift truck.

8. The method as claimed in claim 6, wherein the second decelerated speed is minimum operating speed required for emergency driving of the electrical forklift truck.

9. The method as claimed in claim 6, wherein the decreasing of the operating torque is performed for each of a plurality of intervals sequentially formed in a direction of decreasing the operating torque being decreased, and the operating torque that is finally decreased is a minimum operating torque required for emergency driving of the electrical forklift truck, and if the temperature of the motor or the power module increases up to a predetermined temperature corresponding to the corresponding operating torque in the state where the operating torque has been decreased by the minimum operating torque, the control unit shutdowns the motor.

10. The method as claimed in claim 6, wherein, the control unit determines that the power module is in an over-heating state after decreasing the operating torque and controls to notify the shutdown of the motor.

11. The method as claimed in claim 1, wherein the operating speed of the motor is controlled to be linearly decelerated for every predetermined temperature interval.

12. The method as claimed in claim 6, wherein the operating torque of the motor is controlled to be linearly decreased for every predetermined temperature interval.

13. The method as claimed in claim 1, wherein, if the temperature does not increase up to a temperature corresponding to the corresponding decelerated speed during a predetermined time in a state where the operating speed of the motor has been decelerated by the first decelerated speed or the second decelerated speed, the control unit observes if the temperature of the motor or the power module increases to the predetermined temperature corresponding to the corresponding operating speed while increasing the operating speed of the motor to the operating speed that is prior to being decelerated.

14. A method for controlling a motor of an electrical forklift truck which comprises at least one motor for traveling of the forklift truck or providing power to a pump that supplies power for operating a vehicle or oil to operational devices, a power module for controlling the power supply to the at least one motor, and a control unit for controlling the power module and the motor, the method comprising:

determining that a temperature of the motor and/or the power module increases to a predetermined first level temperature value, the predetermined first level temperature value being based on the operating torque of the motor;

in response to determining that the temperature reaches the predetermined first level temperature value, using the control unit to decrease operating torque of the motor to be predetermined first torque;

while the motor is in a state of the torque of the motor having been decreased, determining that the temperature of the motor and/or the power module increases and reaches a predetermined second level temperature value, the predetermined second level temperature value being higher than the first level temperature value and based on the first torque; and in response to determining that the temperature reaches the predetermined second level temperature value, using the control unit to control the motor to be driven in predetermined second torque that is lower than the first torque.

15. The method as claimed in claim 14, wherein, the control unit controls to decelerate the operating speed of the motor to be predetermined first decelerated speed, when a temperature of the motor and/or the power module increases and reaches predetermined first-level temperature value corresponding to operating speed of the motor in a state where the torque of the motor is decreased by the second torque, and the control unit controls to decelerate the operating speed of the motor to be predetermined second decelerate speed that is lower than the first decelerated speed, when a temperature of the motor and/or the power module increases and reaches a predetermined second-level temperature value that is higher than the first-level temperature value and corresponds to the first decelerated speed in a state where the speed of the motor has been decelerated.

16. The method as claimed in claim 15, wherein, the control unit controls the speed of the motor to be predetermined third decelerated speed that is lower than the second decelerated speed and determines that the power module is in an over-temperature state so as to notify the shutdown of the motor, when a temperature of the power module continuously increases even at the second decelerated speed and reaches predetermined third-level temperature value that is higher than the second-level temperature value.

17. The method as claimed in claim 16, wherein the second torque and the third operating speed are minimum operating torque and minimum operating speed required for emergency driving of the electrical forklift truck, respectively, and if the temperature of the motor and/or the power module increases over the predetermined temperature at the third operating speed, the control unit shutdowns the motor.

18. The method as claimed in claim 14, wherein the control unit observes if the temperature of the motor or the power module increases up to the predetermined temperature corresponding to the corresponding operating speed while increasing the operating speed of the motor up to the operating speed that is prior to being decelerated, when the temperature of the motor and/or the power module does not increase up to the predetermined temperature corresponding to the corresponding operating speed for a predetermined time period in a state where the operating speed of the motor has been decelerated.

19. A device for controlling a motor of an electrical forklift truck, comprising:

a drive motor for driving;

a pump motor for pumping oil;

power modules for the motors;

a control unit for controlling the motors and power modules;

speed sensors and temperature sensors mounted on the drive motor and the pump motor, respectively; and current sensors and temperature sensors mounted on the power modules for the drive motor and the pump motor, respectively, wherein the control unit is configured to:

receive a signal from the speed sensors and the temperature sensors; and for each of a plurality of temperature intervals of the power module, linearly decelerate the driving of the drive motor and the pump motor corresponding to a predetermined operating speed for the operating speed of the drive motor and the pump motor, and linearly decrease the torque of the drive motor and the pump motor corresponding to a predetermined torque outputted from the drive motor and the pump motor.

* * * * *